United States Patent
Rajadurai et al.

(10) Patent No.: US 12,170,893 B2
(45) Date of Patent: Dec. 17, 2024

(54) METHOD AND USER EQUIPMENT FOR DETERMINING WHETHER BASE STATION IS GENUINE OR ROUGE IN WIRELESS NETWORK

(71) Applicant: Samsung Electronics Co., Ltd., Suwon-si (KR)

(72) Inventors: Rajavelsamy Rajadurai, Bangalore (IN); Anil Agiwal, Bangalore (IN); Fasil Abdul Latheef, Bangalore (IN); Mangesh Abhimanyu Ingale, Bangalore (IN); Rohini Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/768,658

(22) PCT Filed: Oct. 14, 2020

(86) PCT No.: PCT/KR2020/014024
§ 371 (c)(1),
(2) Date: Apr. 13, 2022

(87) PCT Pub. No.: WO2021/075854
PCT Pub. Date: Apr. 22, 2021

(65) Prior Publication Data
US 2024/0114337 A1  Apr. 4, 2024

(30) Foreign Application Priority Data

Oct. 14, 2019 (IN) .............................. 201941041577
Oct. 10, 2020 (IN) ........................... 2019 41041577

(51) Int. Cl.
*H04W 12/043* (2021.01)
*H04W 12/06* (2021.01)
(Continued)

(52) U.S. Cl.
CPC ......... *H04W 12/043* (2021.01); *H04W 12/06* (2013.01); *H04W 12/108* (2021.01); *H04W 12/122* (2021.01)

(58) Field of Classification Search
CPC ... H04W 12/00; H04W 12/043; H04W 12/06; H04W 12/08; H04W 12/108; H04W 12/122
See application file for complete search history.

(56) References Cited

U.S. PATENT DOCUMENTS 8,073,428 B2 * 12/2011 Khetawat .............. H04W 16/16
455/461
8,204,502 B2 *  6/2012 Khetawat ................ H04W 8/04
455/445
(Continued)

FOREIGN PATENT DOCUMENTS

CN        103546989 B     8/2016
CN        106028331 A    10/2016
(Continued)

OTHER PUBLICATIONS

3GPP TR 33.809 V0.6.0, 3rd Generation Partnership Project, Technical Specification Group Services and System Aspects, Study on 5G Security Enhancement against False Base Stations, (Release 16), Sep. 22, 2019, sections 6.2.3, 6.71, 6.7.2.1.
(Continued)

*Primary Examiner* — Hosuk Song
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home,
(Continued)

smart building, smart city, smart car, connected car, health care, digital education, smart retail, security and safety services. Embodiments herein provide a method for determining whether a base station is genuine or rouge in a wireless network. If a received authentication key matches with the authentication key generated in the UE, the method includes identifying a base station as genuine base station and carrying out a normal procedure. If the received authentication key does not match with the generated authentication key, the method includes identifying the base station as a rouge base station. The authentication key can be a digital signature (DS), a Message Authentication Code-Integrity (MAC-I), and a hash of MIB/SIBs including PCI.

20 Claims, 12 Drawing Sheets

(51) Int. Cl.
  *H04W 12/108* (2021.01)
  *H04W 12/122* (2021.01)

(56) References Cited

U.S. PATENT DOCUMENTS

| | | | |
|---|---|---|---|
| 9,100,849 | B2 | 8/2015 | Wang et al. |
| 10,306,470 | B2 | 5/2019 | Agiwal et al. |
| 10,932,132 | B1* | 2/2021 | Gundavelli ......... H04W 12/106 |
| 11,070,981 | B2* | 7/2021 | Lee ...................... H04W 12/03 |
| 11,115,822 | B2* | 9/2021 | Ohlsson .............. H04W 12/037 |
| 11,228,911 | B2* | 1/2022 | Nam .................... H04W 12/041 |
| 11,463,875 | B2* | 10/2022 | Lee ........................ H04W 76/27 |
| 11,589,235 | B2* | 2/2023 | Ohlsson .................. H04W 8/24 |
| 2015/0271194 | A1 | 9/2015 | Szucs et al. |
| 2016/0073302 | A1* | 3/2016 | Yang ................ H04W 36/0061 370/331 |

FOREIGN PATENT DOCUMENTS

| | | |
|---|---|---|
| CN | 108076460 A | 5/2018 |
| KR | 10-2018-0114244 A | 10/2018 |
| WO | 2017/176068 A1 | 10/2017 |

OTHER PUBLICATIONS

3GPP TS 23.502 V16.2.0, 3rd Generation Partnership Project, Technical Specification Group Services and System Aspects, Procedures for the 5G System (5GS), Stage 2, (Release 16), Sep. 24, 2019.

Indian Office Action dated Feb. 14, 2022, issued in Indian Patent Application No. 201941041577.

* cited by examiner

FIG. 8

| y \ x | 0 | 1 | 2 | 0 | 1 | 2 |
|---|---|---|---|---|---|---|
| 0 | ZONE0 | ZONE1 | ZONE2 | ZONE0 | ZONE1 | ZONE2 |
| 1 | ZONE3 | ZONE4 | ZONE5 | ZONE3 | ZONE4 | ZONE5 |
| 2 | ZONE6 | ZONE7 | ZONE8 | ZONE6 | ZONE7 | ZONE8 |
| 0 | ZONE0 | ZONE1 | ZONE2 | ZONE0 | ZONE1 | ZONE2 |
| 1 | ZONE3 | ZONE4 | ZONE5 | ZONE6 | ZONE4 | ZONE5 |

METHOD AND USER EQUIPMENT FOR DETERMINING WHETHER BASE STATION IS GENUINE OR ROUGE IN WIRELESS NETWORK

TECHNICAL FIELD

The present disclosure relates to a wireless communication system, and more specifically to a method and a User Equipment (UE) for determining whether a base station is genuine or rouge in a wireless network using a digital signature (DS) and a Message Authentication Code-Integrity (MAC-I).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window su-perposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In a legacy wireless communication system, a UE which presents in a coverage of a wireless communication network can operate in a Radio Resource Control (RRC) idle state or an RRC inactive state or an RRC connected state. In the RRC connected state, the UE connects with a Base Station (BS) and securely communicates with the BS. In the RRC inactive state also, the UE securely communicates with the BS. In the RRC idle state, the UE camps on a cell by choosing the cell and completing a cell selection/reselection process. While camping to the cell, the UE monitors a paging channel of the cell to detect incoming calls, a change in a system information (e.g. a Master Information Block (MIB) and a System Information Block (SIB)), and optionally an Earthquake and Tsunami Warning System (ETWS) notification. Further, the UE performs neighboring cell measurements and cell selection/reselection process. Further, the UE acquires the system information.

Additionally, the UE can access services such as a sidelink discovery transmission/reception, a Multimedia Broadcast and Multicast Service (MBMS) reception, a sidelink communication transmission/reception, and a Vehicle to Vehicle (V2V) communication transmission/reception from the cell in the RRC idle state and the RRC inactive state. In order to access a desired service from the camped cell, the UE should be able to validate that the system information received from the cell is authentic and/or cell/BS from which the UE has received system information is authentic (i.e., the BS is genuine). If the UE is unable to validate the system information, then the UE uses an incorrect configuration in the system information leading to a Denial-of-Service (DoS).

In the legacy wireless communication system, the UE camps to the cell when the cell belongs to a selected/registered/equivalent Public Land Mobile Network (PLMN) and non-forbidden tracking area, a S-criterion met, and the cell is not barred. The UE does not validate whether the system information received from the cell is authentic or not, i.e. the UE does not validate an authenticity of the camped cell. Due to not validating the authenticity of the camped cell or the system information, a fake BS (i.e. a rouge BS) can take advantage of relaying the MIB and/or SIBs to the UE as relaying like a genuine BS. Further, the fake BS can initiate attacks like modification of the system information, stopping of paging to the UE camped on the fake BS, mounting targeted attacks on a ciphered user plane traffic, and the like.

DISCLOSURE OF INVENTION

Technical Problem

For a more advanced and secure wireless communication system, an effective system and method for authenticating the cell or the system information received from the cell, and hardening a security of the BS to prevent operations of the fake BS is needed.

Solution to Problem

Accordingly, the embodiments herein provide a method for determining whether a base station (BS) is genuine or rouge in a wireless network. The method includes receiving, by a UE in the wireless network, an authentication key generated on a broadcasted information from the base station. Further, the method includes validating, by the UE, whether a received system information is not a modified information by matching the received authentication key with a generated authentication key, at the UE, on the received system information from the base station. Further, the method includes determining, by the UE, whether the received authentication key matches with the generated authentication key in response to successful validation of the received system information. Further, the method includes performing, by the UE, one of: in response to determining that the received authentication key matches with the authentication key generated in the UE, identifying the base station as genuine base station and carrying out a normal procedure, and in response to determining that the received authentication key does not match with the generated authentication key, identifying the base station as a rouge base station.

In an embodiment, the authentication key is at least one of a digital signature (DS), a Message Authentication Code-Integrity (MAC-I) and a hash value of master information block (MIB) or system information blocks (SIBs) including a Physical Cell Identifier (PCI).

In an embodiment, the authentication key is provided to the UE, by the BS, using at least one of a broadcasted system information block and a radio resource control (RRC) signalling messages.

In an embodiment, when the received authentication key matches with the authentication key generated in the UE (100), the UE further determines that a list of cells available in the wireless network (1000) is a subset of a received neighbouring cell list for identifying the base station as genuine base station and carrying out a normal procedure In an embodiment, the authentication key associated with the BS is generated by determining, by the BS, whether the protected system information block comprises one of a first set of parameters, a second set of parameters, a third set of parameters and a fourth set of parameters, generating, by the BS, the authentication key associated with the BS based on one of the first set of parameter, the second set of parameter, the third set of parameter and the fourth set of parameters, and appending, by the BS, the generated authentication key to at least one of the protected system information block, RRC signalling message.

In an embodiment, the first set of parameters comprises a master information or a system information, a neighbouring cell list, a key used for digital signing (K-SIG), combination of a Physical Cell Identifier (PCI) and an absolute radio-frequency channel number Downlink (ARFCN DL), and a time counter.

In an embodiment, the second set of parameters comprises a neighbouring cell list, a K-SIG, combination of a PCI and ARFCN DL, a time counter, and a MIB/SIB.

In an embodiment, the third set of parameters comprises a neighbouring cell list, a K-SIG, a combination of a PCI and an ARFCN DL, a time counter, and combination of a SIB3, SIB4 and SIB5.

In an embodiment, the fourth set of parameters comprises at least one of an AS security context of the UE, Physical Cell Identifier (PCI) of a cell, a physical cell downlink frequency of a cell and a Cell Radio Network Temporary Identifier (C-RNTI) assigned to the UE.

The authentication key is generated by computing hash values of one of MIB and SIBs along with a PCI of the base station.

Accordingly, the embodiments herein provide a UE for determining whether a BS is genuine or rouge in a wireless network. The UE includes a processor coupled with a memory. The processor receives an authentication key generated on a broadcasted information from the base station. Further, the processor validates whether a received system information is not a modified by matching the received authentication key with a generated authentication key, at the UE, on the received system information from the base station. Further, the processor determines whether the received authentication key matches with the generated authentication key in response to successful validation of the received system information. Further, the processor performs one of: in response to determines that the received authentication key matches with the authentication key generated in the UE, identify the base station as genuine base station and carry out a normal procedure, and in response to determine that the received authentication key does not match with the generated authentication key, identify the base station as a rouge base station.

Accordingly, the embodiments herein provide a method for determining whether a base station (BS) is genuine or rouge in a wireless network based on the PCI. The method includes receiving, by the UE, the authentication key (i.e., MAC-I/HASH) generated using PCI as one of the input in the BS and provided to the UE over RRC message. Further, the method includes verifying, by the UE, the received authentication key with the generated authentication key, wherein the base station generates the authentication key on the broadcasted information along with its PCI value and the UE generates the authentication key on the received system information along with the PCI of the cell. In response to matching that the received authentication key with the generated authentication key, the method includes identifying the base station as a potential genuine base station. In response to the received authentication key does not match with the generated authentication key, the method includes identifying the base station as a rouge base station.

In an embodiment, the Digital signature (DS) on the neighbouring PCIs are provided to the UE over the broadcasted information block.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The principal object of the embodiments herein is to provide a method and a UE for identifying a genuine BS. The proposed method allows the BS to add operational parameters such as a Physical Cell Identifier (PCI) as input for a hash verification to identify the genuine BS. Thus, the proposed method prevents a rouge BS to replicate as a genuine one. Addition of the operational parameters increases a toughness for a rouge BS to mount a MITM attack and a DoS attack and restricts wider range of operations of a cell. The hash verification at the UE fails in case the rouge BS modifies the operational parameter. Hence, the UE can detect the rouge BS in response to a failure in the hash verification. Even if the rouge BS is operating within or near vicinity of the genuine BS with the PCI of the genuine BS, then the genuine BS can identify the rouge BS due to operating both the BS using the same PCI, causes radio interference which is similar to a frequency jammer. Thus, a probability of the UE to camp on the rouge BS is reduced which improves a security in the wireless communication network.

Another object of the embodiments herein is to identify the rouge BS, using Digital Signature (DS) method and based on detection of PCIs in its vicinity. UE in IDLE or INACTIVE or CONNECTED mode receives the system information block from the cell, to validate the authenticity of the received system information the UE verifies the DS. If DS verification fails the rouge cell is identified. If the DS verification is successful, the UE checks if the scanned/measured cell list is the subset of the received neighboring cell list (i.e., UE checks for at least for example 2 or more cell matches), if it does not matches, then the UE suspects cell and try to attach with other cell in the vicinity.

Another object of the embodiments herein is to fulfil a potential security requirement of a key issue #2 (KI #2) as captured in TR 33.809, when the UE is operating in an RRC connected state. The proposed method does not require any additional key provisioning and setup procedure for identifying the rouge BS. The proposed method only requires transporting hashes of MIB/SIBs or MIB/SIBs generated along with the PCI using a secure RRC signaling.

BRIEF DESCRIPTION OF DRAWINGS

This method and UE are illustrated in the accompanying drawings, throughout which like reference letters indicate corresponding parts in the various figures. The embodiments herein will be better understood from the following description with reference to the drawings, in which:

FIG. 8 illustrates list of zone IDs of zones broadcasts by a cell as per a geographical zone concept defined in a Long Term Evolution (LTE) Vehicle-to-Everything (V2X), according to the embodiments as disclosed herein;

MODE FOR THE INVENTION

Figure 1:
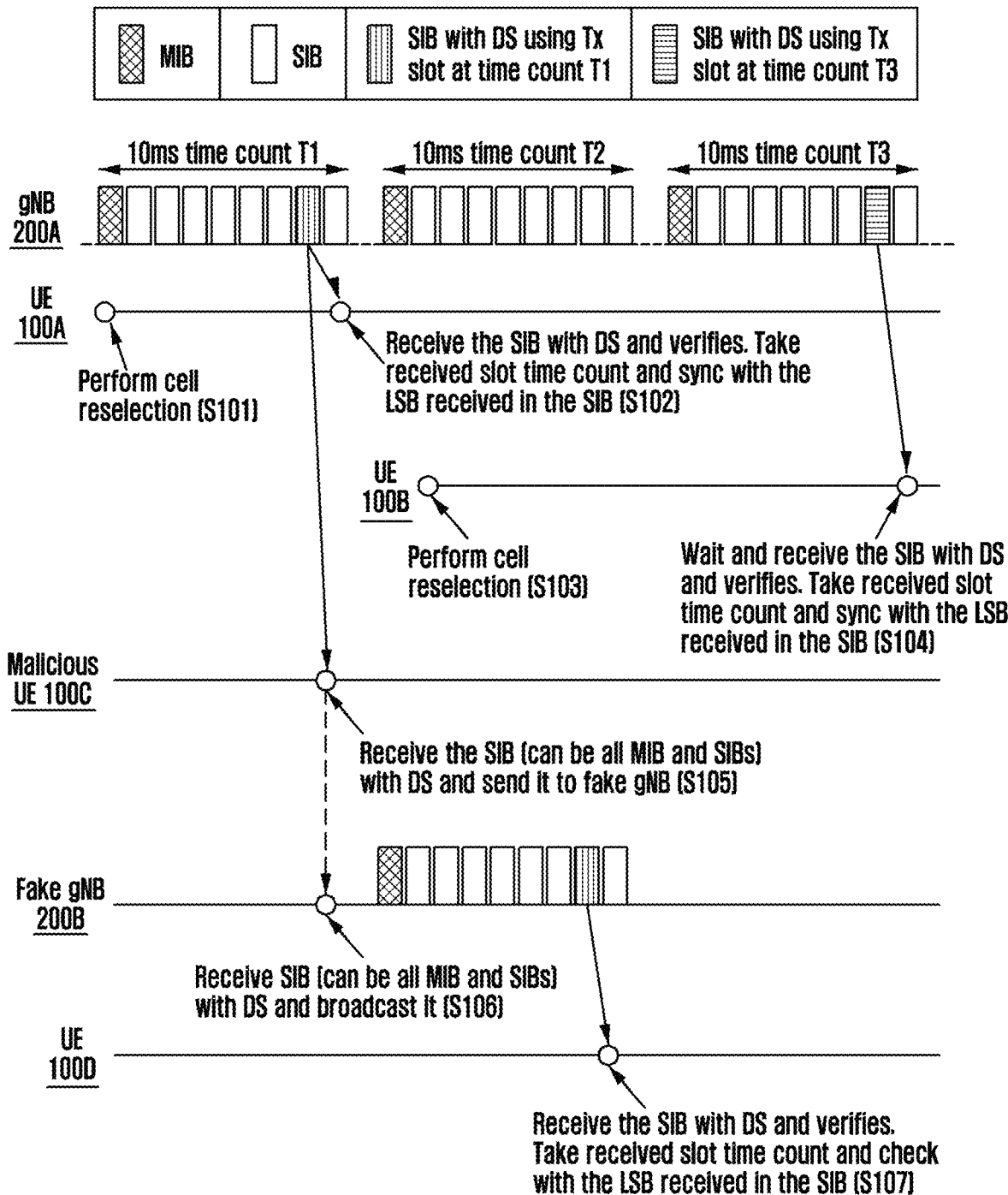
FIG. 1 illustrates a MITM attack method of obtaining a connectivity between a fake cell and the UE, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Terms "cell", "Base Station" and "BS" are used interchangeably in this disclosure and means a 5G/NR cell or an LTE cell in which a User Equipment (UE) can camp on. Also, the BS can be an eNB or a gNB. A fake/false/rouge BS means an unauthorized BS from an attacker operating on operational parameters of a licenced mobile operator to mount a DoS on the UE, a targeted attack on the UE or a user plane of the UE, and the like. A genuine BS means an authorized BS. The embodiments detailed in this disclosure address an identification of the fake BS and an identification of any modification made on the operational parameters of the genuine BS/cell by the fake BS.

Accordingly, the embodiments herein provide a method for determining whether a base station is genuine or rouge in a wireless network. The method includes receiving, by a UE in the wireless network, an authentication key generated on a broadcasted information from the base station. Further, the method includes validating, by the UE, whether a received system information is not a modified information by matching the received authentication key with a generated authentication key, at the UE, on the received system information from the base station. Further, the method includes determining, by the UE, whether the received authentication key matches with the generated authentication key in response to successful validation of the received system information. Further, the method includes performing, by the UE, one of: in response to determining that the received authentication key matches with the authentication key generated in the UE, identifying the base station as genuine base station and carrying out a normal procedure, and in response to determining that the received authentication key does not match with the generated authentication key, identifying the base station as a rouge base station.

Unlike existing methods and systems, the proposed method allows the BS to add operational parameters such as PCI as input for a hash verification to prevent the fake BS to replicate as a genuine one. The hash verification at the UE fails in case the fake BS modifies the operational parameter. Hence, the UE can detect the fake BS in response to a failure in the hash verification. Even if the fake BS is operating within or near vicinity of the genuine BS with the PCI of the genuine BS, then the genuine BS can identify the fake BS due to operating both the BS using the same PCI, causes radio interference which is similar to a frequency jammer. Thus, a probability of the UE to camp on the fake BS is reduced which improves a security in the wireless communication network.

Addition of the operational parameters increases a toughness for the fake BS to mount a MITM attack and a DoS attack and restricts wider range of operations of the cell.

The MIB/SIBs are mostly containing a radio configuration information that is used for the UE to make a connection to the wireless communication network and stay in a connected state. Hence, the method allows the UE to detect the modification of MIB/SIBs during a connection establishment would significantly reduce an impact of SI modification by the false BS.

The proposed method fulfils a potential security requirement of a KI #2 when the UE is operating in an RRC connected state. The proposed method does not require any additional key provisioning and setup procedure for identifying the fake BS. The proposed method only requires transporting hashes of MIB/SIBs or MIB/SIBs using a secure RRC signaling. The proposed method allows the UE to verify not only the MIB/SIBs that the UE has already read but also the MIB/SIBs the UE would read at a later time.

Referring now to the drawings, and more particularly to FIGS. 1 through 10, there are shown preferred embodiments.

FIG. 1 illustrates a Man-in-the-Middle (MITM) attack method of obtaining a connectivity between a fake gNB 200B (i.e. the fake BS) and a UE 100D. Consider that a gNB 200A is the genuine BS. A UE 100A camps on the gNB 200A. The gNB 200B computes a Digital Signature (DS) for the UE 100A based on a time count of a transmission slot for the UE 100A. The gNB 200A broadcasts the system information for three time counts T1, T2 and T3, where a duration of each time count is 10 milliseconds. Each system information includes one MIB and eight SIBs. The UE 100A performs (S101) a cell reselection procedure. Further, the UE 100A receives (S102) a SIB with the DS using Tx slot at the time count T1 (herein called first SIB), and verifies the DS, where the DS was calculated based on the time count T1. Further, the UE 100A obtains the received time count T1 and synchronizes with a Least Significant Bit (LSB) in the first SIB. After an interval of time, a UE 100B performs (S103) the cell reselection procedure. Further, the UE 100B receives (S104) a SIB with the DS using Tx slot at the time count T3 (herein called as second SIB) and verifies the DS. The UE 100B obtains the received time count T3 and synchronizes with a LSB in the second SIB.

Consider, a malicious UE 100C is present in vicinity to the gNB 200B. The malicious UE 100C receives (S105) the first SIB and sends the first SIB to the fake gNB 200B. The fake gNB 200B receives (S106) the first SIB and broadcasts the first SIB by pretending as the genuine BS. A UE 100D present in vicinity of the fake gNB 200B, receives (S107) the first SIB with the DS broadcasted by the fake BS 200B and verifies the DS. The UE 100D obtains the received time count T1 and synchronizes with the LSB in the first SIB. Despite of a difference in the received time slot T1, the UE 100D does not identify the fake gNB 200B or identify that the UE 100D has received the first SIB from the fake gNB 200B. Further, the UE 100D camps on the fake gNB 200B, so that, the fake gNB 200B has complete control on a user plane of the UE 100D and unprotected AS messages (e.g. RRC Reject). The UE 100D does not have access to an accurate clock information for a DS verification, as shown in the FIG. 1. So, an effective system and method for authenticating the cell or the system information received from the cell, and hardening a security of the BS to prevent operations of the fake BS is needed.

Figure 2:
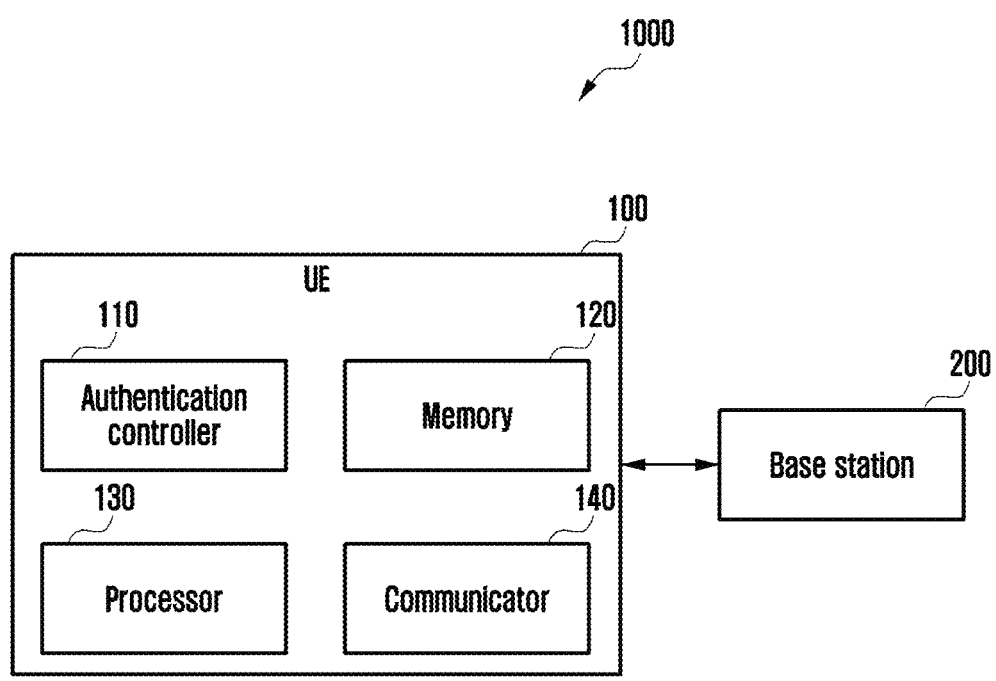
FIG. 2 is a block diagram of a system for identifying a genuine BS, according to an embodiment as disclosed herein.

FIG. 2 is a block diagram of a system 1000 for identifying the genuine base station, according to an embodiment as disclosed herein. In an embodiment, the system 1000 includes a UE 100 and a BS 200, where the UE 100 is connected to the BS 200. Examples for the UE 100 are, but not limited to a smart phone, a tablet computer, a personal digital assistance (PDA), an Internet of Things (IoT), and the like. In an embodiment, the UE 100 includes an authentication controller 110, a memory 120, a processor 130, and a communicator 140.

The authentication controller (110) is configured to receive a protected system information block (as shown in the FIG. 4-FIG. 6) comprising the authentication key and a neighbouring cell list from the base station (200). The authentication key is a digital signature (DS), a Message Authentication Code-Integrity (MAC-I), and a hash of the MIB/SIBs.

The protected system information block is also called as "protected system information" and "protected system info". In an embodiment, the protected system information block includes a Least Significant Bit (LSB) of a time counter, a master information or a system information, a Digital Signature (DS), and a neighbouring cell list. In an embodiment, the neighbour cell list includes at least one of intra frequency neighbours and inter frequency neighbours.

In another embodiment, the protected system information block includes the LSB of the time counter, the DS, and the neighbouring cell list. In another embodiment, the protected system information block includes the time counter, the DS, and the neighbouring cell list. The authentication controller 110 is configured to validate an authenticity of the protected system information block received from the BS 200.

In an embodiment, the authentication key associated with the BS (200) is generated by determining whether the protected system information block comprises one of a first set of parameters, a second set of parameters, a third set of parameters and a fourth set of parameters, generating the authentication key associated with the BS based on one of the first set of parameter, the second set of parameter, the third set of parameter and the fourth set of parameters, and appending the generated authentication key to at least one of the protected system information block and RRC signalling message. The details operations of the generation of the authentication key associated with the BS (200) is explained in the FIG. 4 to FIG. 6.

The first set of parameters comprises a master information or a system information, a neighbouring cell list, a key used for digital signing (K-SIG), combination of a Physical Cell Identifier (PCI) and an absolute radio-frequency channel number Downlink (ARFCN DL), and a time counter. The second set of parameters comprises a neighbouring cell list, a K-SIG, combination of a PCI and ARFCN DL, a time counter, and a MIB/SIB. The third set of parameters includes a neighbouring cell list, a K-SIG, a combination of a PCI and an ARFCN DL, a time counter, and combination of a SIB3, SIB4 and SIB5. The fourth set of parameters comprises at least one of an AS security context of the UE, Physical Cell Identifier (PCI) of a cell, a physical cell downlink frequency of a cell and a Cell Radio Network Temporary Identifier (C-RNTI) assigned to the UE.

The authentication controller (110) receives an authentication key generated on a broadcasted information from the base station (200). Further, the authentication controller (110) validates whether a received system information is not a modified by matching the received authentication key with a generated authentication key, at the UE (100), on the received system information from the base station (200). In response to successful validation of the received system information, the authentication controller (110) determines whether the received authentication key matches with the generated authentication key. Further, the authentication controller (110) detects that a list of cells available in the wireless network is a subset of a received neighbouring cell list. If the received authentication key matches with the authentication key generated in the UE, and detect that the list of cells available in the wireless network is the subset of a received neighbouring cell list, the authentication controller (110) identifies the base station (200) as genuine base station and carry out a normal procedure. If the received authentication key does not match with the generated authentication key, the authentication controller (110) identifies the base station as a rouge base station.

Further, the authentication controller 110 is configured to attach with other cell in a vicinity of the UE 100, in response to detecting the rouge BS. In an embodiment, when the UE 100 detects a particular PCI not in the scanned subset of the neighbouring cell list, then the UE 100 determines that the BS 200 is a rouge one. In an embodiment, when the DS and one or more cells in the list of neighbour cells are available, then the UE 100 never camps on the cell that is suspected as the fake BS.

The memory 120 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory 120 respectively. In certain examples, a non-transitory storage medium may store data that can, over time, change (e.g., in Random Access Memory (RAM) or cache).

The processor 130 is configured to execute instructions stored in the memory 120. The communicator 140 is configured to communicate internally between hardware components in the UE 100. Further, the communicator 140 is configured to facilitate the communication between the UE 100 and other devices (e.g. BSs, other UEs, etc.)

Although the FIG. 2 shows the hardware components of the system 1000 but it is to be understood that other embodiments are not limited thereon. In other embodiments, the system 1000 may include less or more number of components. Further, the labels or names of the components are used only for illustrative purpose and does not limit the scope of the invention. One or more components can be combined together to perform same or substantially similar function for identifying the genuine BS.

Figure 3:
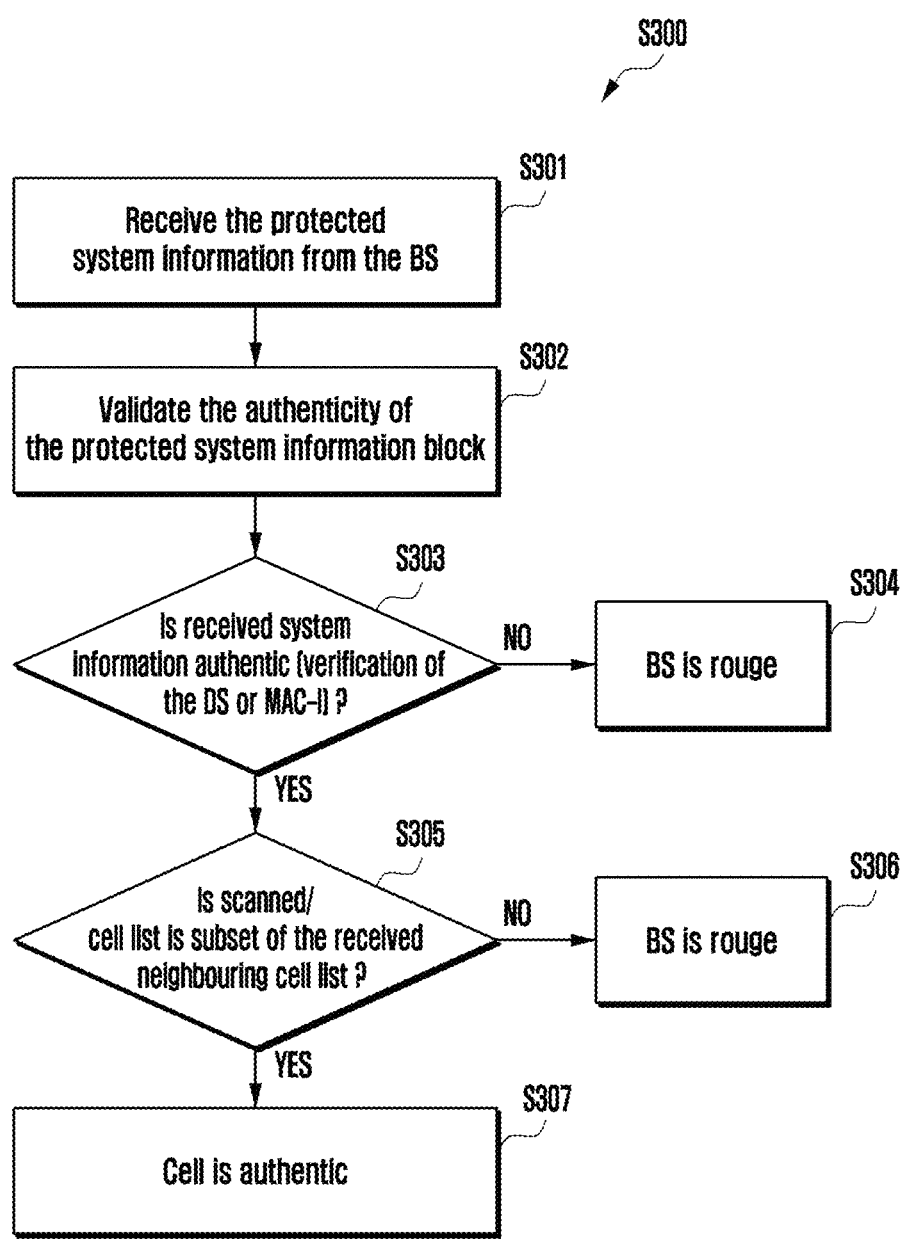
FIG. 3 is a flow diagram illustrating a method for identifying the genuine BS, according to an embodiment as disclosed herein.

FIG. 3 is a flow diagram 300 illustrating a method of for identifying the genuine base station, according to an embodiment as disclosed herein. At step S301, the method includes receiving the protected system information from the BS 200. In an embodiment, the method allows the authentication controller 110 to receive the protected system information from the BS 200. At step S302, the method includes validating the authenticity of the protected system information block. In an embodiment, the method allows the authentication controller 110 to validate the authenticity of the protected system information block. At step S303, the method includes determining whether the authentication key of the protected system information block matches the stored authentication key in response to the successful validation of the protected system information block. In an embodiment, the method allows the authentication controller 110 to determine whether the authentication key of the protected system information block matches the stored authentication key in response to the successful validation of the protected system information block.

At step S304, the method includes detecting that the rouge BS, in response to determining that the authentication key of the protected system information block does not match with the stored authentication key. In an embodiment, the method allows the authentication controller 110 to detect the rouge BS, in response to determining that the authentication key of the protected system information block does not match with the stored authentication key. At step S305, the method includes determining whether the scanned cell list is the subset of the received neighbouring cell list, in response to determining that the authentication key of the protected system information block matches with the stored authentication key. In an embodiment, the method allows the authentication controller 110 to determine whether the scanned cell list is the subset of the received neighbouring cell list, in response to determining that the authentication key of the protected system information block matches with the stored authentication key.

At step S306, the method includes identifying the rouge BS, in response to determining that the scanned cell list is not the subset of the received neighbouring cell list. In an embodiment, the method allows the authentication controller 110 to identify the rouge BS, in response to determining that the scanned cell list is not the subset of the received neighboring cell list. At step S307, the method includes identifying the genuine BS, in response to determining that the scanned cell list is the subset of the received neighbouring cell list. In an embodiment, the method allows the authentication controller 110 to identify the genuine BS, in response to determining that the scanned cell list is the subset of the received neighbouring cell list.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
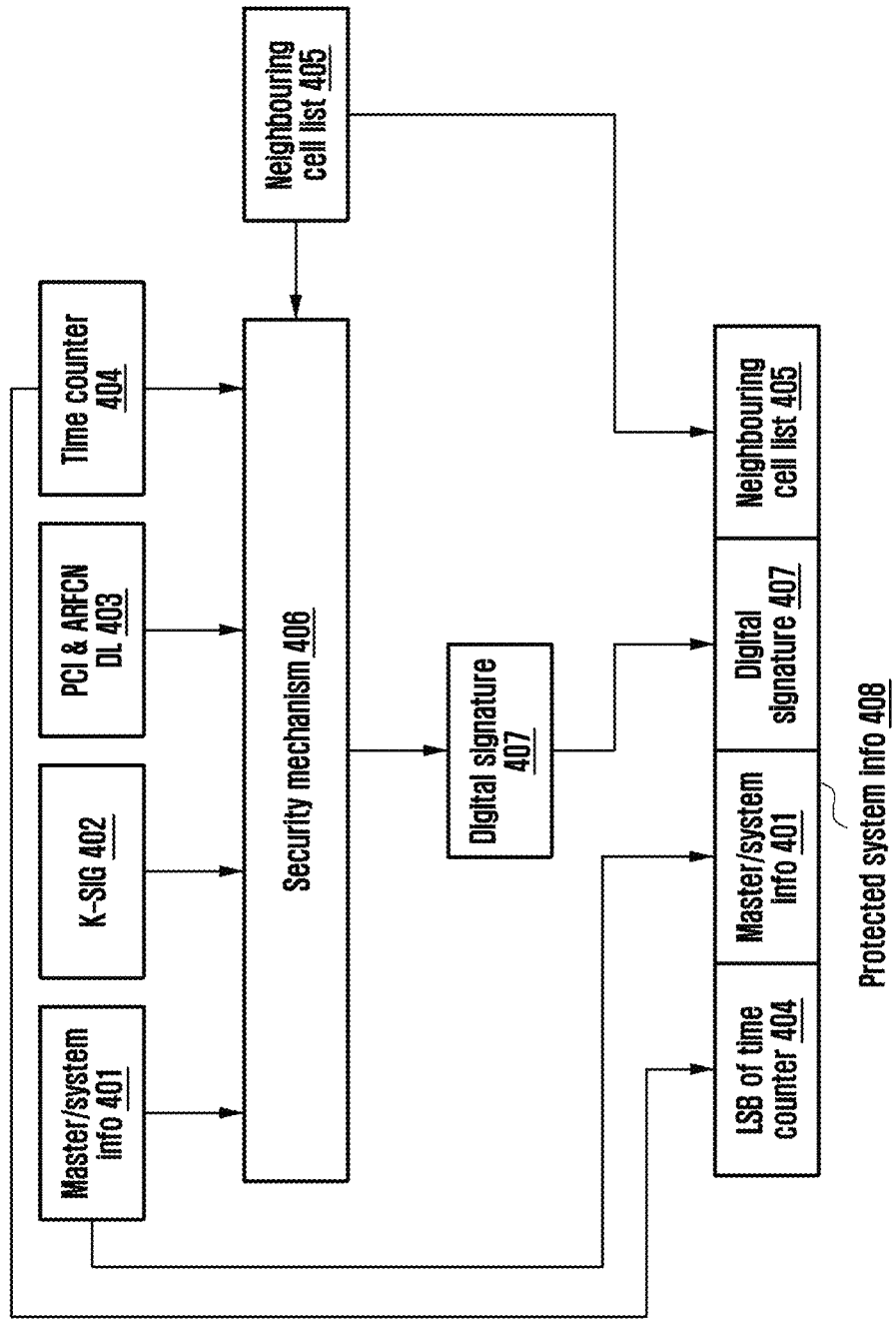
FIG. 4 is a flow diagram illustrating a mechanism for protection of a system information on per SIB/MIB basis, according to the embodiments as disclosed herein.

FIG. 4 is a flow diagram illustrating a mechanism for protection of the system information on per SIB/MIB basis, according to the embodiments as disclosed herein. The BS 200 generates the DS using operational parameters includes the PCI and the ARFCN-DL 403 (i.e. Physical cell downlink frequency) of a broadcasting cell, the neighboring cell list 405, the time counter 404, the cell ID, the K-SIG 402 and the master/system info 401 (i.e. MIB/SIB), where the K-SIG 402 is a key used for digital signing (e.g. private key in Public Key Infrastructure (PKI)). Further, the BS 200 appends the generated DS to the master/system info 401 along with the neighboring cell list 405 and an LSB of the time counter 404 for the protection of the master/system info information 401. In an embodiment, the neighboring cell list 405 contains PCIs of the neighboring cells and the ARFCN-DLs.

The addition of the PCI as the operational parameter to the DS generation is to ensure that the PCI and the physical cell downlink frequency are not manipulated and to harden a security at the BS 200A even if the MIB/SIBs are replayed by the rouge cell. When the fake BS 200B operates within or near vicinity of the genuine BS 200A with the PCI and physical cell downlink frequency of the genuine BS 200A, then the genuine BS 200A identifies the fake BS 200B due to operating by the fake BS 200B using the PCI and the physical cell downlink frequency of the genuine BS 200A. Due to operating the fake BS 200B and the genuine BS 200A using the same the PCI and the physical cell downlink frequency, causes a radio interference which is similar to a frequency jammer. When the fake BS 200B operates far-off from the genuine BS 200A, then the PCI and the physical cell downlink frequency restricts the operation and the fake BS 200B may not be listed as the neighboring cell by the nearby genuine BS 200A at that location. For performing a successful attack, the attacker need to operate in the co-site with replicated PCI and downlink frequency and cannot operate in other sites where the frequency is different.

If frequency and PCI are same and in overlapping coverage area, if fake gNB is not perfectly aligned, it creates interference (similar to jamming attack) for both a) if fake just relays the packets from genuine gNB and b) if fake transmits its own packets. This makes it difficult for the fake gNB to operate in same frequency for uplink (the genuine gNB) and for downlink (with victim UE).

Figure 5:
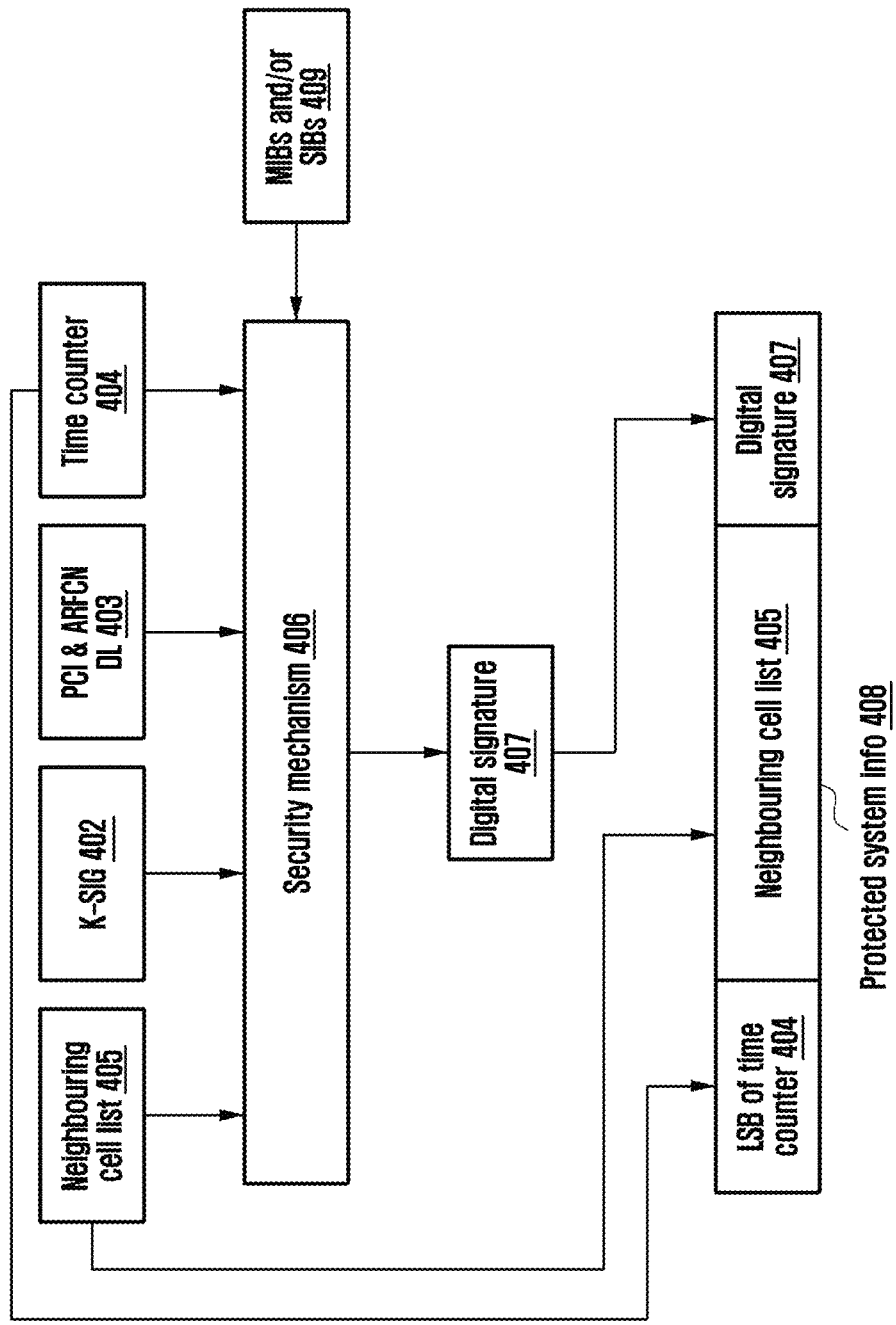
FIG. 5 is a flow diagram illustrating another mechanism for authenticity verification in a new SIB, according to the embodiments as disclosed herein.

FIG. 5 is a flow diagram illustrating a mechanism for authenticity verification in a new SIB, according to the embodiments as disclosed herein. The BS 200 generates the DS using operational parameters include the PCI and the ARFCN-DL 403 of the broadcasting cell, the neighboring cell list 405, the time counter 404, the cell ID, the K-SIG 402 along with the SIB/MIB information 409. Further, the BS 200 appends the generated DS with the neighboring cell list 405 and the LSB of the time counter 404 as the new SIB, in addition to the existing SIBs.

Figure 6:
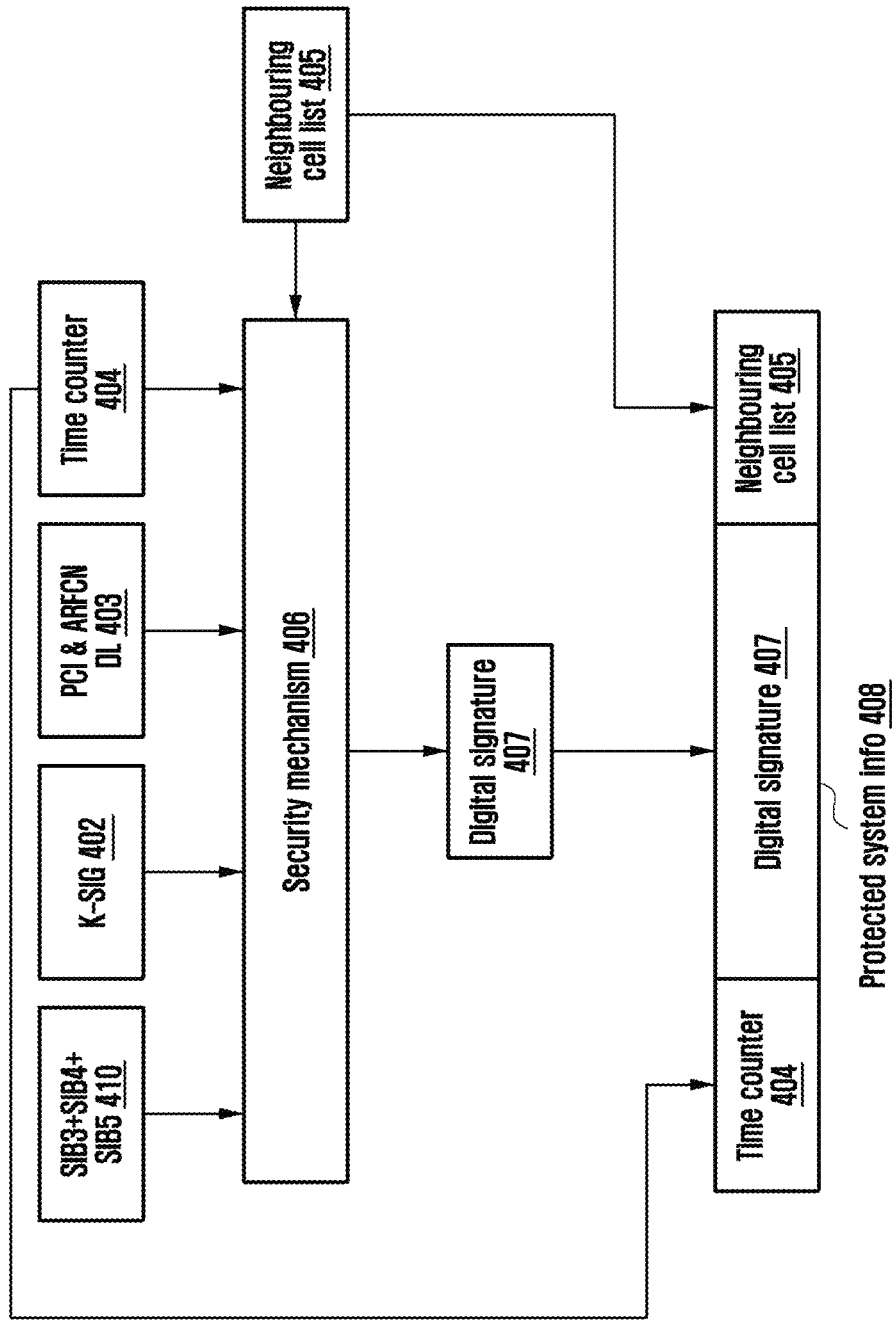
FIG. 6 is a flow diagram illustrating another mechanism for authenticity verification of a new SIB/MIB information, according to the embodiments as disclosed herein.

FIG. 6 is a flow diagram illustrating a mechanism for authenticity verification of a new SIB/MIB information, according to the embodiments as disclosed herein. The BS 200 generates the DS using selected SIBs 410 (e.g., SIB3, SIB4, SIB5) along with the operational parameters include the PCI and the ARFCN-DL 403 of the broadcasting cell, the cell ID along with the neighboring cell list 405, the time counter 404, the K-SIG 402. Further, the BS 200 appends the generated DS with the neighboring cell list 405 and the LSB of the time counter 404 in order to protect only the selected SIBs 410.

Figure 7A:
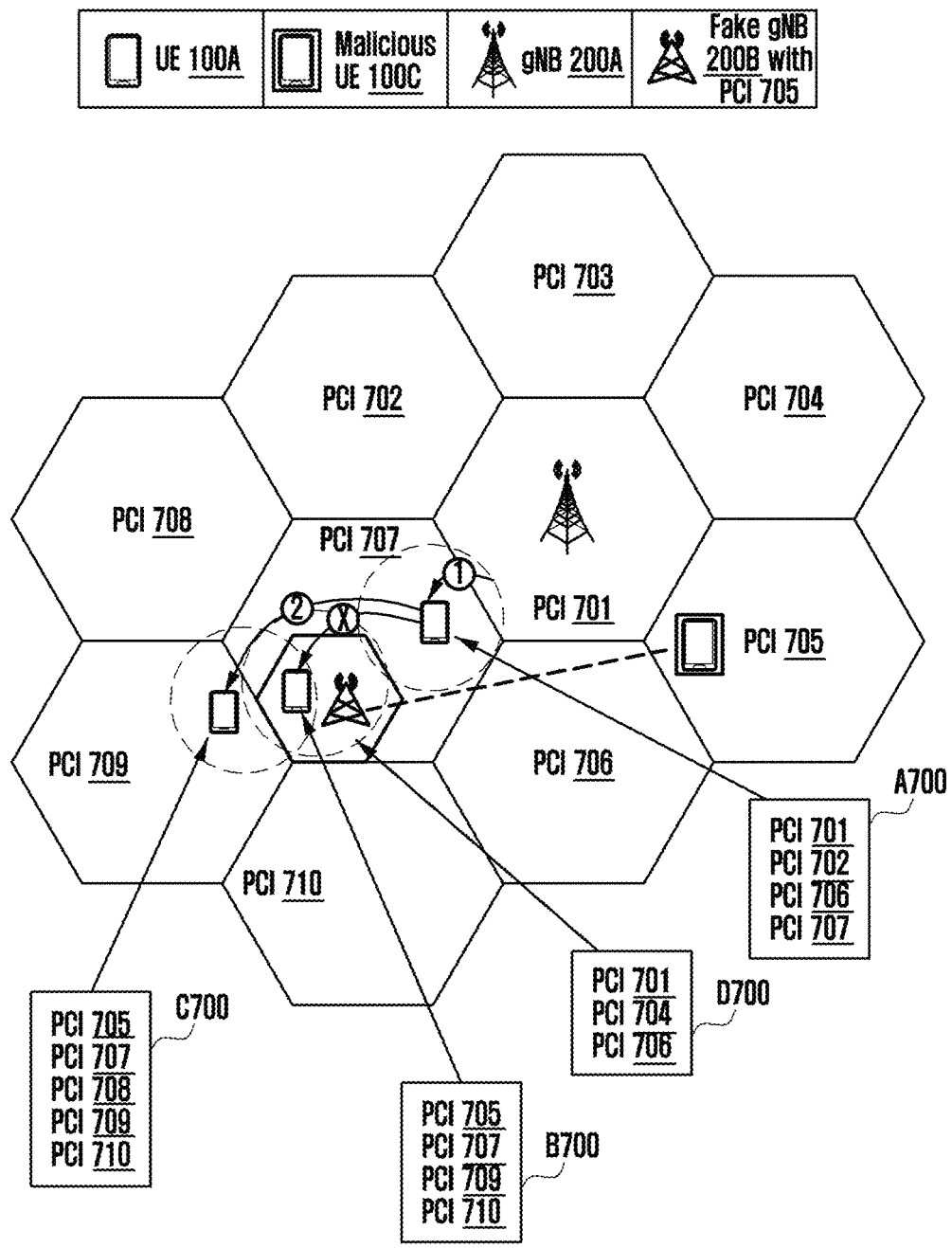
FIG. 7A illustrates an example scenario for identification of the fake cell when the fake cell is mounted at any location of a genuine cell, according to the embodiments as disclosed herein.
Figure 7B:
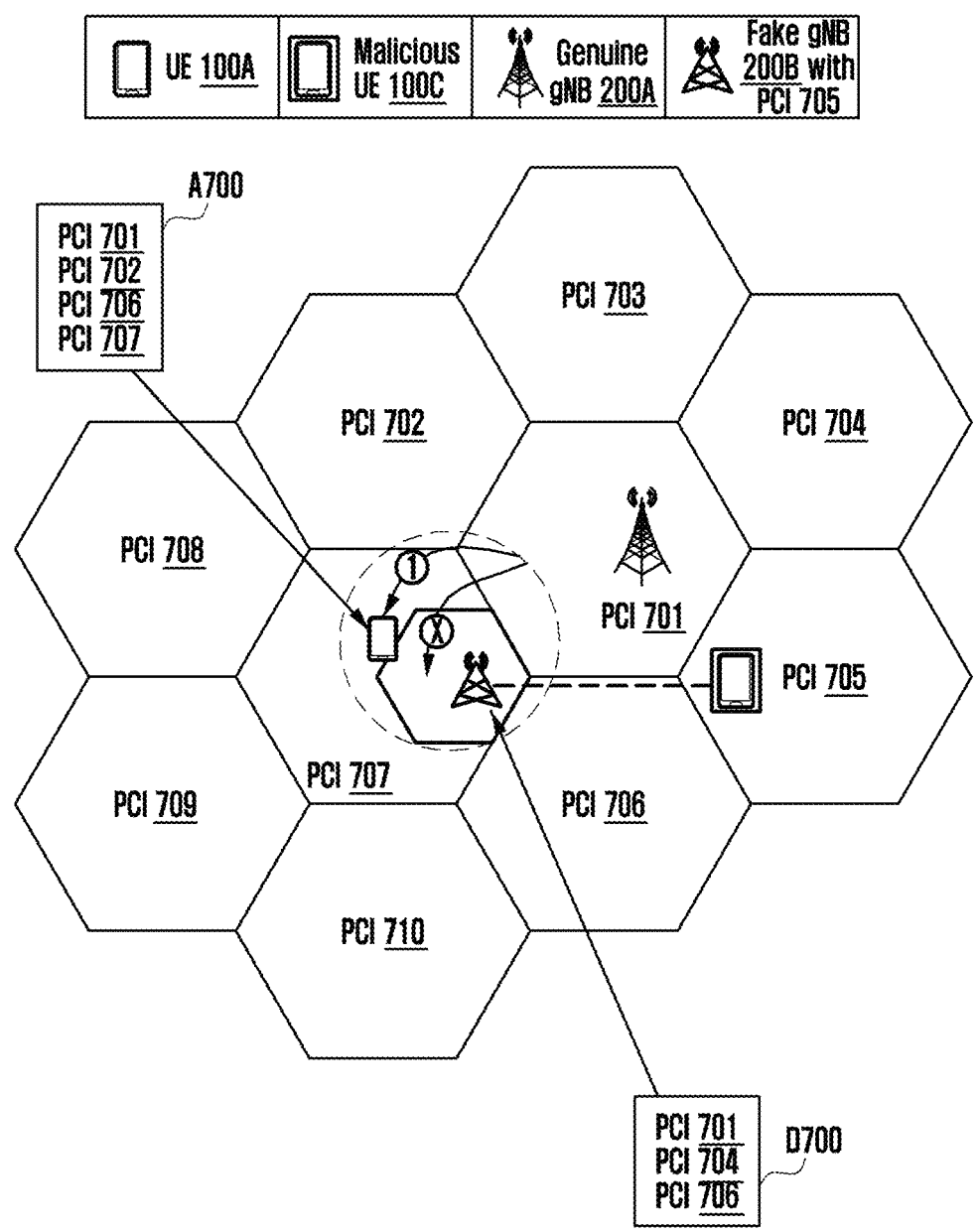
FIG. 7B illustrates an example scenario for identification of the fake cell when the fake cell is mounted at any location of a genuine cell, according to the embodiments as disclosed herein.

FIG. 7A-7B illustrate an example scenario for identification of the fake cell (i.e. fake gNB) 200B when the fake cell 200B is mounted at any location of the genuine cell (gNB) 200A, according to the embodiments as disclosed herein. With respect to the FIG. 7A, the fake cell 200B is located within one side of a cell with PCI 707, and the UE 100A is located near to the fake cell 200B, where the UE 100A moved from PCI 701 to PCI 707 (1). The UE 100A measures/scans the list of cells present in a particular location. Consider A700, B700 and C700 be the list of neighboring cells scanned by the UE 100A. Consider, the D700 be the list of neighboring cells broadcasted by the fake cell 200B. The A700 contains PCI 701, PCI 702, PCI 706, and PCI 707. The B700 contains PCI 705, PCI 707, PCI 709, and PCI 700. The C700 contains PCI 705, PCI 707, PCI 708, PCI 709, and PCI 710. The D700 contains PCI 701, PCI 704, and PCI 706. The UE 100A verifies the authenticity of the cell by checking if a particular PCI is not present as the subset of the neighboring cell list scanned/measured by the UE 100A. Further, the UE 100A identifies PCI 705 as a fake one, as the scanned list is not the subset of the broadcasted list. So the UE avoids the movement (x), but does the movement (2). In the example scenario, the ARFCN-DL along with the PCI can also use to identify the fake cell 200B.

With respect to the FIG. 7B, the fake cell 200B is located within other side of the cell with PCI 707, and the UE 100A is located near to the fake cell 200B. The neighboring cell list in A700 is updated as PCI 701, PCI 702, PCI 705, PCI 706, and PCI 707. The D700 contains PCI 701, PCI 704, and PCI 706. The UE 100A verifies the authenticity of the cell by checking if the particular PCI and/or ARFCN-DL is not present as the subset of the neighboring cell list scanned/measured by the UE 100A. Further, the UE 100A identifies PCI-5 (and/or the ARFCN-DL of the PCI-5) as the fake one, as the scanned list is not the subset of the broadcasted list and avoids the cell (X).

Figure 7C:
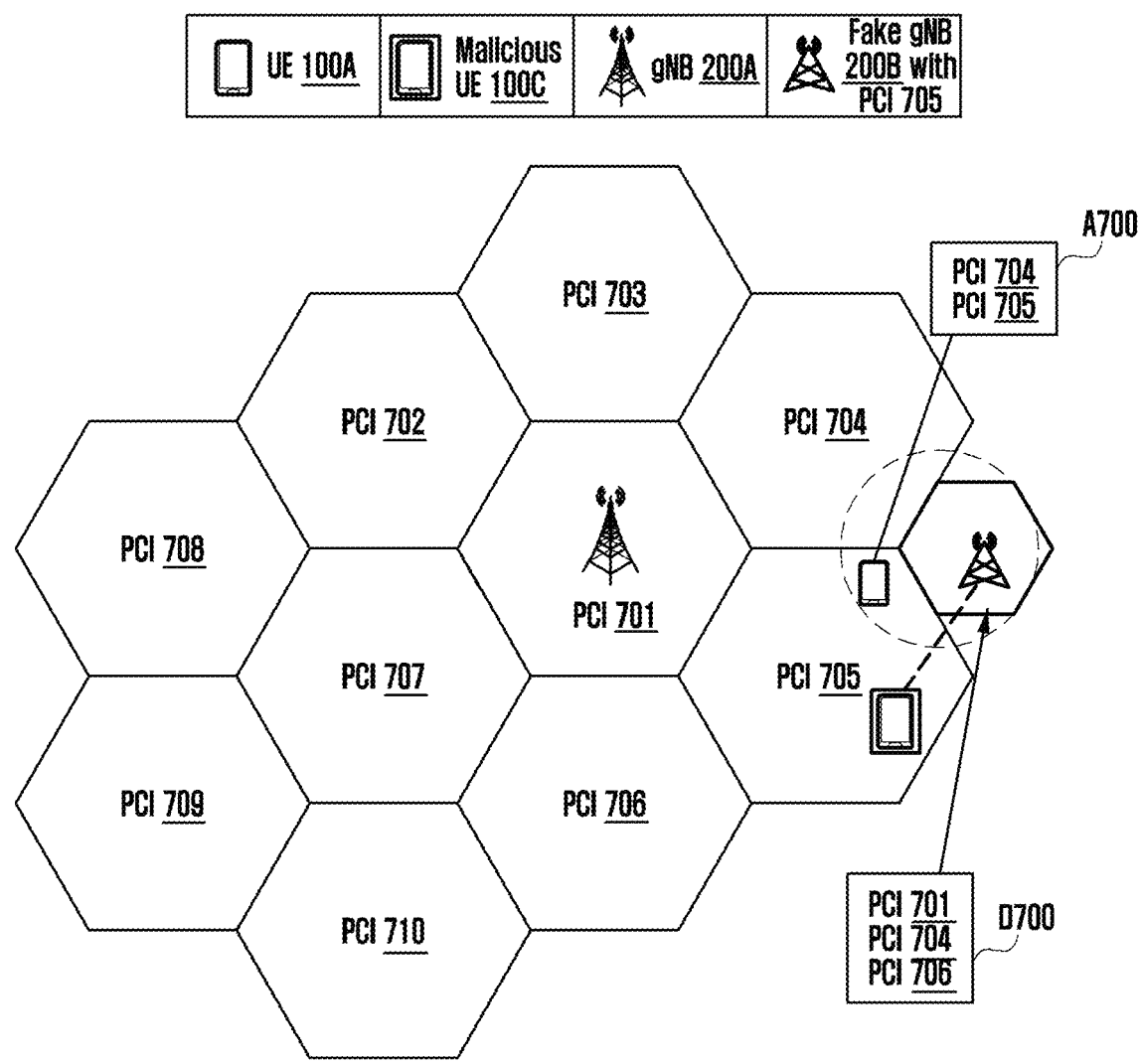
FIG. 7C illustrates an example scenario for identification of the fake cell when the fake cell is mounted at an edge of genuine cells, according to the embodiments as disclosed herein.

FIG. 7C illustrates an example scenario for identification of the fake cell 200B when the fake cell 200B is mounted at an edge of the genuine cells, according to the embodiments as disclosed herein. The fake cell 200B is located at the edge of the genuine cells with PCI 704 and PCI 705, and the UE 100A is located near to the fake cell 200B. The neighboring cell list in A700 is updated as PCI 704, PCI 705. The D700 contains PCI 701, PCI 704, and PCI 706. The possibility of the attack by the fake cell 200B is minimal as the MIB/SIBs are digitally signed and the UE 200A may not perform the cell reselection. When the fake cell 200B operates within or near vicinity of the genuine cell 200A by using the PCI and the ARFCN-DL of the genuine cell 200A, then the genuine cell 200A identifies the fake cell 200B. The genuine cell 200A identifies the fake cell 200B due to operating the fake BS 200B and the genuine BS 200A using the same the PCI and the ARFCN-DL, causes the radio interference which is similar to the frequency jammer.

FIG. 8 illustrates list of zone IDs of zones broadcasts by the cell 200A as per a geographical zone concept defined in an LTE V2X, according to the embodiments as disclosed herein. Instead of the neighboring cell list 405, the cell 200A broadcasts the list of zone IDs of the zones covered by the cell 200A. The UE 100A determines the zone ID of the UE 100A based on a latitude or a longitude of the UE 100A. The Zone ID in the LTE V2X is determined based on equations 1, 2 and 3.

$$x' = \text{Floor}(x/L) \text{Mod } N_x; \quad (1)$$

$$y' = \text{Floor}(y/W) \text{Mod } N_y; \quad (2)$$

$$\text{Zone ID} = y'^* N_x + x' \quad (3)$$

where, values of x and y are a geodesic distance in the longitude and the latitude between UE's location and geographical coordinate (0,0) respectively; L and W are a length and width of the zone respectively. Nx is the value of zoneIdLongiMod included in zoneConfig in SystemInformationBlockType21 or SystemInformationBlockType26 or in SL-V2X-Preconfiguration. Ny is the value of zoneIdLatiMod included in zoneConfig in SystemInformationBlockType21 or SystemInformationBlockType26 or in SL-V2X-Preconfiguration. In an embodiment, parameters L, W, N, and N y are signaled by an Access and Mobility management Function (AMF) or Security Anchor Function (SEAF) to the UE 100A through the NAS message.

When the UE 100A detects the cell 200A and the zone ID of the UE 100A is not present in the list of zone IDs that broadcasted by the cell 200A, then the UE 100A assumes that the cell 200A is fake (i.e. unauthorized). When the UE 100A detects the cell 200A and the zone ID of the UE 100A is present in the list of zone IDs that broadcasted by the cell 200A, then the UE 100A assumes that the cell 200A is genuine (i.e. authorized). Identifying the fake BS 200B is more important in case of critical verticals such as V2X UEs. The V2X UEs anyway have Global Positioning System (GPS) capabilities. Even if all the UEs are not capable of GPS, the UEs which are capable of the GPS identifies and even report a location of the fake gNB 200B to the wireless communication network.

Figure 9:
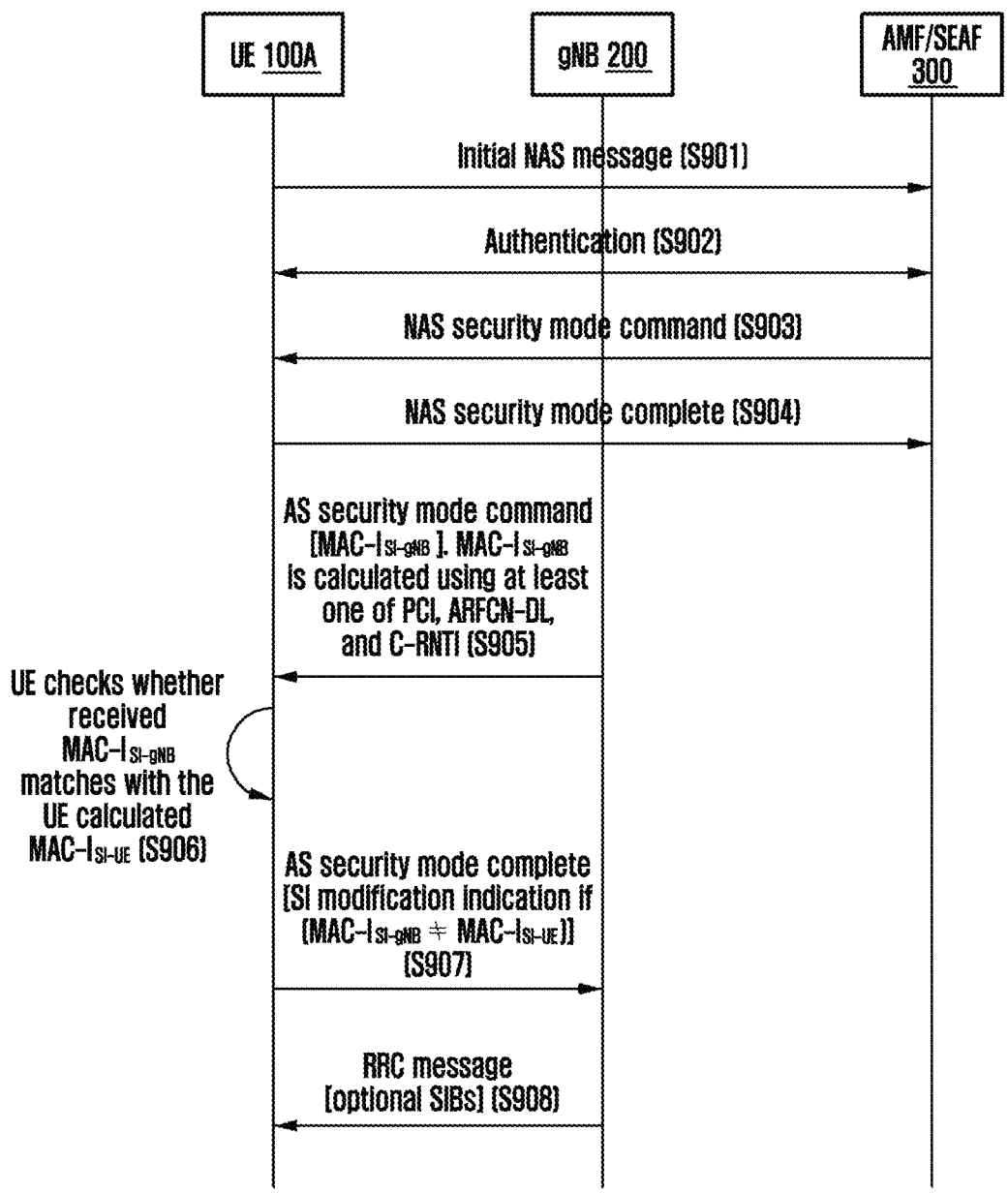
FIG. 9 is a signaling diagram illustrating a method for preventing the UE from a MITM attack and a DoS attack, according to the embodiments as disclosed herein.

FIG. 9 is a signaling diagram illustrating a method for preventing the UE 100A from the MITM attack and the DoS attack, according to the embodiments as disclosed herein. At step S901, the UE 100A sends an initial NAS message to an Access and Mobility Management Function (AMF)/Security Anchor Function (SEAF) 300. At step S902, the UE 100A performs a primary authentication with the AMF/SEAF 300. At step S903, the AMF/SEAF 300 sends a NAS security mode command to the UE 100A optionally with an indication of support for protection of the system information. In an embodiment, an Anti-Bidding Down between Architectures (ABBA) parameter is used to indicate that the AMF/SEAF 300 supports for protection of the system information. In response to receiving the indication of support for the protection of the system information, the UE 100A stores the indication as part of a security context. At step S904, the UE 100A sends a NAS security mode complete to the AMF/SEAF 300. At step S905, the gNB 200 sends an AS security mode command to the UE 100A with a list of hash i.e., MAC-$I_{SI-gNB}$ values of MIB/SIBs. The MAC-$I_{SI-gNB}$ is computed using the AS security context of the UE 100A and the operational parameters include at least one of the PCI of the cell, the ARFCN-DL of the cell and a C-RNTI assigned to the UE 100A, where the C-RNTI is assigned by the genuine gNB 200A during a RRC connection establishment. At step S906, the UE 100A computes a list of hash, i.e. MAC-$I_{SI-UE}$. Further, the UE 100A checks whether the received MAC-$I_{SI-gNB}$ of the MIB/SIBs matches with the MAC-TR UE computed at the UE 100A and determines whether the MIB/SIBs that the UE 100A has read are correct or not. At step S907, in response to determining a mismatch between the received MAC-TR gNB of the MIB/SIBs and the computed MAC-TR UE, the UE 100A sends an AS security mode complete optionally including a list of MIB/SIBs whose hash is mismatched in the step S906. At step S908, the gNB 200 sends the RRC message to the UE 100A that includes the MIB/SIBs, in response to receiving the list of MIB/SIBs from the UE 100A. In an embodiment, when the mismatch is detected, the UE 100A identifies the fake BS 200B and requests for new the MIB/SIBs or moves out of the cell. Rest of signaling are same as in 3GPP TS 23.502 and/or TS 38.331 specification. In an embodiment, the MAC-$I_{SI-gNB}$ calculated at the gNB 200 is included as a separate Information Element (IE) in the RRC message from the gNB (200) to the UE 100A.

Figure 10:
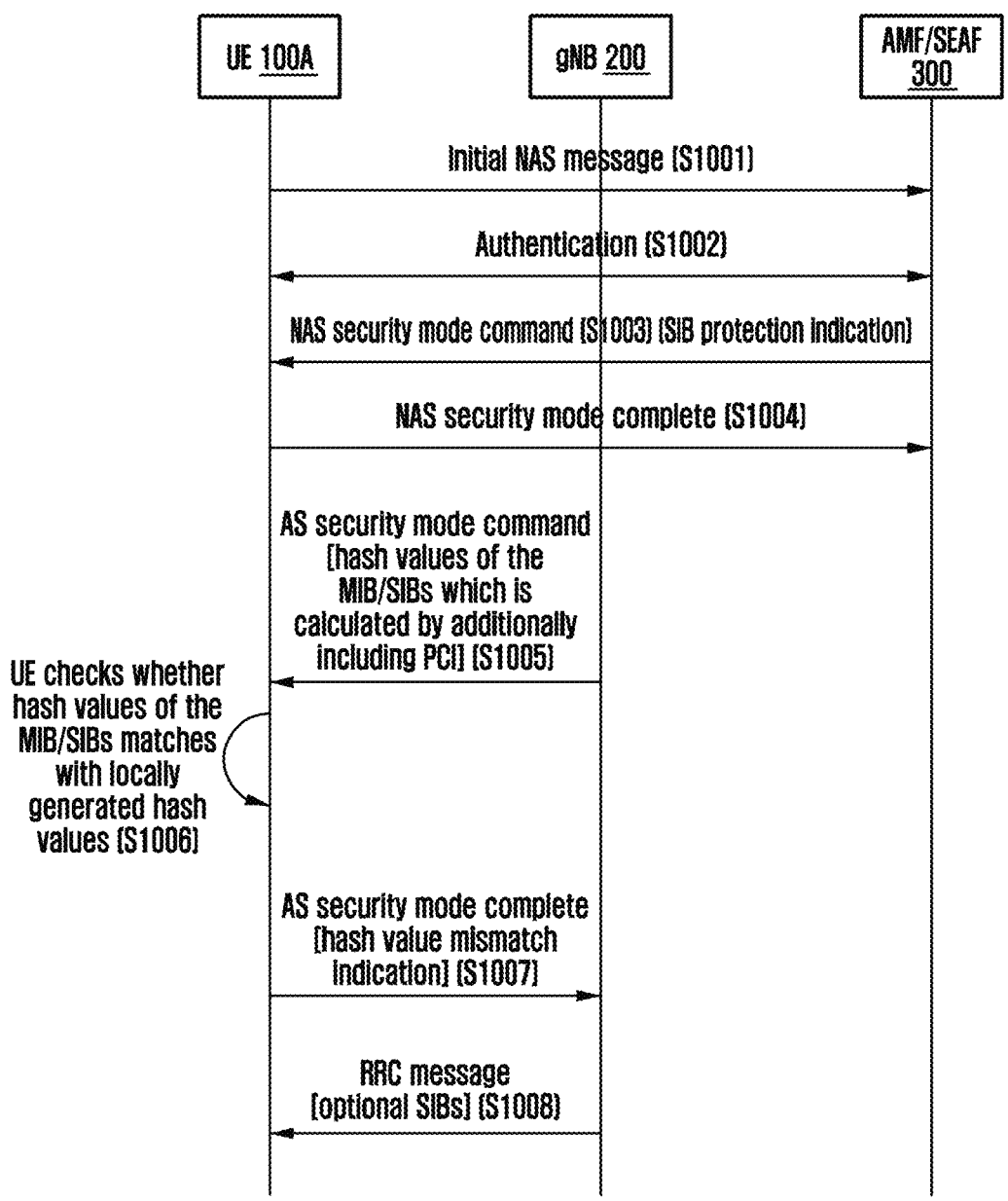
FIG. 10 is another signaling diagram illustrating a method for preventing the UE from a MITM attack and a DoS attack, according to the embodiments as disclosed herein.

FIG. 10 is another signaling diagram illustrating a method for preventing the UE from a MITM attack and a DoS attack, according to the embodiments as disclosed herein. At step S1001, the UE 100A sends the initial NAS message to the AMF/SEAF 300. At step S1002, the UE 100A performs a primary authentication with the AMF/SEAF 300. At step S1003, the AMF/SEAF 300 sends the NAS security mode command to the UE 100A optionally with an indication of support for protection of the system information. In response to receiving the indication of support for the protection of the system information, the UE 100A stores the indication as part of a security context. At step S1004, the UE 100A sends the NAS security mode complete to the AMF/SEAF 300. At step S1005, the gNB 200 sends an AS security mode command to the UE 100A with a list of hash value of the SIB(s) and/or MIB. The hash values of MIB/SIB are generated by additionally including the PCI of the cell. The hash value of MIB and hash of each SIB are provided separately so that the UE (100) can only validate the MIB and SIBs that it has read. At step S1006, the UE 100A computes the hash values of the MIB/SIB matches with a local generated hash values based on the received MIB/SIB(s) additionally including the PCI of the cell. At step S1007, in response to determining a mismatch between the hash values of the MIB/SIB with the local generated hash values, the UE 100A sends an AS security mode complete optionally including a list of MIB/SIBs whose hash is mismatched in the step S1007. At step S1008, the gNB 200 sends the RRC message to the UE 100A that includes the MIB/SIBs, in response to receiving the list of MIB/SIBs from the UE 100A.

In an embodiment, the HASH/MAC-$I_{SI-gNB}$ of MIB and SIB is calculated separately using AS security context established between the UE 100A and the gNB 200. This security context includes at least one of cryptographic keys at AS level with their identifiers, selected AS level cryptographic algorithms. Based on these input parameters the sender computes a 32-bit message authentication code MAC-$I_{SI-gNB}$ using the integrity algorithm NIA. The message authentication code is then appended to the message when sent. For integrity protection algorithms, the receiver computes the expected message authentication code XMAC-$I_{SI-gNB}$ on the message received in the same way as the sender computed its message authentication code on the message sent and verifies the data integrity of the message by comparing it to the received message authentication code, i.e. MAC-I$_{SI\text{-}gNB}$. Algorithm used could be any of the 128-NIA1, 128-NIA2, 128-NIA3 as specified in Annex B of TS 33.401. In another embodiment, the security key for calculation of hashes are pre-provisioned at the UE or using a pre-agreed hardcoded value like all "0"s or all "1"s.

In another embodiment, the HASH/MAC-I$_{SI\text{-}gNB}$ is calculated using any HASH algorithm MD5, Secure HASH Function (SHA-0, SHA-1, SHA-2, SHA-3 and SHA256), including the PCI of the cell and at least one of the MIB/SIB(s).

Unlike existing methods and systems, the proposed method allows the gNB 200 to add operational parameters such as the PCI as input for a hash verification to prevent the fake BS 200B to replicate as the genuine one. The hash verification at the UE 100A fails in case the fake BS 200B modifies the operational parameter. Hence, the UE 100A can detect the fake BS 200B in response to a failure in the hash verification. Even if the fake BS 200B is operating within or near vicinity of the genuine BS with the PCI of the genuine BS 200A, then the genuine BS 200A can identify the fake BS 200B due to operating both the BS using the same PCI, causes the radio interference which is similar to the frequency jammer. Thus, a probability of the UE 100A to camp on the fake BS 200B is reduced which improves a security in the wireless communication network. Addition of the operational parameters increases a toughness for the fake BS 200B to mount the MITM attack and the DoS attack and restricts wider range of operations of the cell.

In an embodiment, in order to identify the fake BS 200B, one RA resource (preamble/Random Access Channel occasion) is reserved for cell validation. The UE 100A sends an Msg1 using the Radio access (RA) resource. The gNB 200 sends a Random Access Response (RAR) to the UE 100A, where a RAR Service Data Unit (SDU) includes MAC-I instead of a Temporary C-RNT (TC-RNTI), a TA command and an uplink grant. The MAC-I is generated over MIB contents or SIB1 content, SFN/slot number and time count when the slot in which the Msg1 is sent. The UE 100A verifies the MAC-I using non-UE specific key which is pre-provisioned. When a MAC-I validation fails at the UE 100A, the UE 100A determines the gNB 200 as rogue. In an embodiment, the RA resource is reserved at an interval such that the MAC-I generated is not valid across intervals.

In another embodiment, in order to identify the fake BS 200, at least one SIB is provided on demand for a security validation. The UE 100A sends an Msg3 based SI request message to the gNB 200 for acquiring the at least one SIB to identify the fake BS 200. The SI request message includes a random number which is encrypted by the UE 100A using a non UE specific key which is pre-provisioned. The gNB 200 receives the SI request message and decrypts the system information (SI) request message for obtaining the random number. In response to obtaining the random number, the gNB 200 transmits a SI request acknowledgment to the UE 100A. The SI request acknowledgment includes a contention resolution ID i.e. first 48 bits of the encrypted random number. Further, the UE 100A receives the SI request acknowledgment, checks whether the contention resolution ID matches and monitors a SI window for receiving the SI message. In an embodiment, the random number is used to determine the SI window in which the SI message is received.

In one SFN cycle incudes several SI windows depending on a SI period. In one SI window there are several occasions for transmitting the SI message. A SI window number and occasions with the SI window where the SI message is transmitted is determined based on the random number. In an embodiment, the DS based on the time count can further be included in the SI message. In an embodiment, in addition to the PCI, a Global Cell Identity (GCI) can also be used as the operational parameter.

The method can be used to add an operational parameter (i.e., Physical Cell Identifier (PCI)) as input to hash calculation to make it difficult for the Fake gNB to act as genuine gNB. The inclusion of PCI will make it difficult for the fake gNB to replicate as real one and also if any modification is done in these parameter, this may lead to failure of the hash verification and hence presence of fake gNB can be detected. If the fake BS is operating within or near vicinity of the genuine BS with the same PCI, then genuine BS can identify the fake BS, as operating in the same PCI causes radio interference and it is similar to frequency jammer. The inclusion of PCI value in the HASH calculation toughen the fake gNB operation and probability of the UE 100 to camp on the fake gNB is reduced. Therefore, difficulty in mounting the attack is increased.

The proposed method fulfils a potential security requirement of a KI #2 when the UE is operating in an RRC connected state. The proposed method does not fulfil the potential security requirement of the KI #2 when the UE is in the RRC-Idle or the RRC-Inactive state. The proposed method does not require any additional key provisioning and setup procedure for identifying the fake BS. The proposed method only requires transporting hashes of MIB/SIBs or MIB/SIBs using a secure RRC signaling. The proposed method allows the UE to verify not only the MIB/SIBs that the UE has already read but also the MIB/SIBs the UE would read at a later time.

The proposed method requires RAN node to provide the hashes of all MIB/SIBs to UE 100A including those that UE is not interested in. Since the MIB/SIBs mostly contain the radio configuration information that is used for the UE to make a connection to the network and stay in the connected state, enabling to detect the modification of MIB/SIBs during the connection establishment would significantly reduce the impact of SI modification by false base station.

Further addition of PCI in generation of hashes of MIB/SIBs will make it difficult for the fake gNB to replicate as a real one and also if any modification is done in this operational parameter, leads to failure of the hash verification at the UE. Addition of this parameter will increase the toughness in the fake relay base station to mount the MitM attack and restrict wider range of operation (restricted to a cell).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a user equipment (UE) in a communication system, the method comprising:
   receiving, from a base station, an access stratum (AS) security mode command message including a first hash value of a master information block (MIB) or a system information block (SIB);
   comparing the first hash value of the MIB or the SIB received in the AS security mode command message with a second hash value of the MIB or the SIB to validate the MIB or the SIB that the UE has read; and
   identifying whether a hash mismatch for the MIB or the SIB is detected based on the comparison of the first hash value and the second hash value,
   wherein the first hash value is determined by including a physical cell identifier (PCI) of a cell in a calculation of the first hash value of the MIB or the SIB, and
   wherein the second hash value is determined by the UE.

2. The method of claim 1,
   wherein the first hash value of the MIB is compared with the second hash value of the MIB,
   wherein whether the MIB that the UE has read is correct is based on the comparison of the first hash value of the MIB and the second hash value of the MIB,
   wherein the first hash value of the MIB is determined based on the PCI of the cell, and
   wherein the second hash value of the MIB is determined by the UE.

3. The method of claim 1,
   wherein the first hash value of the SIB is compared with the second hash value of the SIB,
   wherein whether the SIB that the UE has read is correct is based on the comparison of the first hash value of the SIB and the second hash value of the SIB,
   wherein the first hash value of the SIB is determined based on the PCI of the cell, and
   wherein the second hash value of the SIB is determined by the UE.

4. The method of claim 1, further comprising:
   in case that the hash mismatch is detected, transmitting, to the base station, an AS security mode complete message including a list of the MIB or the SIB whose hash mismatch is detected.

5. The method of claim 4, further comprising:
   receiving, from the base station, a radio resource control (RRC) message including the MIB or the SIB in the list.

6. A method performed by a base station in a communication system, the method comprising:
   transmitting, to a user equipment (UE), an access stratum (AS) security mode command message including a first hash value of a master information block (MIB) or a system information block (SIB),
   wherein the first hash value of the MIB or the SIB provided in the AS security mode command message is compared with a second hash value of the MIB or the SIB to validate the MIB or the SIB that the UE has read,
   wherein whether a hash mismatch for the MIB or the SIB is detected is based on a comparison of the first hash value and the second hash value,
   wherein the first hash value is determined by including a physical cell identifier (PCI) of a cell in a calculation of the first hash value of the MIB or the SIB, and
   wherein the second hash value is determined by the UE.

7. The method of claim 6,
   wherein the first hash value of the MIB is compared with the second hash value of the MIB,
   wherein whether the MIB that the UE has read is correct is based on the comparison of the first hash value of the MIB and the second hash value of the MIB,
   wherein the first hash value of the MIB is determined based on the PCI of the cell, and
   wherein the second hash value of the MIB is determined by the UE.

8. The method of claim 6,
   wherein the first hash value of the SIB is compared with the second hash value of the SIB,
   wherein whether the SIB that the UE has read is correct is based on the comparison of the first hash value of the SIB and the second hash value of the SIB,
   wherein the first hash value of the SIB is determined based on the PCI of the cell, and
   wherein the second hash value of the SIB is determined by the UE.

9. The method of claim 6, further comprising:
   in case that the hash mismatch is detected, receiving, from the UE, an AS security mode complete message including a list of the MIB or the SIB whose hash mismatch is detected.

10. The method of claim 9, further comprising:
    transmitting, to the UE, a radio resource control (RRC) message including the MIB or the SIB in the list.

11. A user equipment (UE) in a communication system, the UE comprising:
    a transceiver; and
    a processor configured to:
       receive, from a base station via the transceiver, an access stratum (AS) security mode command message including a first hash value of a master information block (MIB) or a system information block (SIB),
       compare the first hash value of the MIB or the SIB received in the AS security mode command message with a second hash value of the MIB or the SIB to validate the MIB or the SIB that the UE has read, and
       identify whether a hash mismatch for the MIB or the SIB is detected based on the comparison of the first hash value and the second hash value,
    wherein the first hash value is determined by including a physical cell identifier (PCI) of a cell in a calculation of the first hash value of the MIB or the SIB, and
    wherein the second hash value is determined by the UE.

12. The UE of claim 11,
    wherein the first hash value of the MIB is compared with the second hash value of the MIB,
    wherein whether the MIB that the UE has read is correct is based on the comparison of the first hash value of the MIB and the second hash value of the MIB,
    wherein the first hash value of the MIB is determined based on the PCI of the cell, and
    wherein the second hash value of the MIB is determined by the UE.

13. The UE of claim 11,
    wherein the first hash value of the SIB is compared with the second hash value of the SIB,
    wherein whether the SIB that the UE has read is correct is based on the comparison of the first hash value of the SIB and the second hash value of the SIB,
    wherein the first hash value of the SIB is determined based on the PCI of the cell, and
    wherein the second hash value of the SIB is determined by the UE.

14. The UE of claim 11, wherein the processor is further configured to:
  in case that the hash mismatch is detected, transmit, to the base station via the transceiver, an AS security mode complete message including a list of the MIB or the SIB whose hash mismatch is detected.

15. The UE of claim 14, wherein the processor is further configured to:
  receive, from the base station via the transceiver, a radio resource control (RRC) message including the MIB or the SIB in the list.

16. A base station in a communication system, the base station comprising:
  a transceiver; and
  a processor configured to:
    transmit, to a user equipment (UE) via the transceiver, an access stratum (AS) security mode command message including a first hash value of a master information block (MIB) or a system information block (SIB),
  wherein the first hash value of the MIB or the SIB provided in the AS security mode command message is compared with a second hash value of the MIB or the SIB,
  wherein whether a hash mismatch for the MIB or the SIB is detected is based on a comparison of the first hash value and the second hash value,
  wherein the first hash value is determined by including a physical cell identifier (PCI) of a cell in a calculation of the first hash value of the MIB or the SIB, and
  wherein the second hash value is determined by the UE.

17. The base station of claim 16,
  wherein the first hash value of the MIB is compared with the second hash value of the MIB,
  wherein whether the MIB that the UE has read is correct is based on the comparison of the first hash value of the MIB and the second hash value of the MIB,
  wherein the first hash value of the MIB is determined based on the PCI of the cell, and
  wherein the second hash value of the MIB is determined by the UE.

18. The base station of claim 16,
  wherein the first hash value of the SIB is compared with the second hash value of the SIB,
  wherein whether the SIB that the UE has read is correct is based on the comparison of the first hash value of the SIB and the second hash value of the SIB,
  wherein the first hash value of the SIB is determined based on the PCI of the cell, and
  wherein the second hash value of the SIB is determined by the UE.

19. The base station of claim 16, wherein the processor is further configured to:
  in case that the hash mismatch is detected, receive, from the UE via the transceiver, an AS security mode complete message including a list of the MIB or the SIB whose hash mismatch is detected.

20. The base station of claim 19, wherein the processor is further configured to:
  transmit, to the UE via the transceiver, a radio resource control (RRC) message including the MIB or the SIB in the list.

* * * * *